United States Patent [19]
Hopkins

[11] 3,766,657
[45] Oct. 23, 1973

[54] TRAILER LEVEL INDICATING DEVICE
[75] Inventor: Evan L. Hopkins, Emporia, Kans.
[73] Assignee: Hopkins Manufacturing Corp., Emporia, Kans.
[22] Filed: Oct. 16, 1970
[21] Appl. No.: 81,360

[52] U.S. Cl. .................... 33/348, 33/371, 33/384
[51] Int. Cl. ..................... G01c 9/32, G01c 9/28
[58] Field of Search ............. 33/207 R, 211, 213, 33/214, 348, 379, 381–383

[56] References Cited
UNITED STATES PATENTS

| | | | |
|---|---|---|---|
| 3,422,544 | 1/1969 | Wyse | 33/207 R |
| 3,603,000 | 9/1971 | Ostrager | 33/211 |
| 692,097 | 1/1902 | Wood | 33/211 |
| 703,306 | 6/1902 | Roe | 33/211 |
| 2,058,743 | 10/1936 | Trippe | 33/207 R |
| 3,225,451 | 12/1965 | Olexson | 33/384 |
| 3,561,128 | 2/1971 | Ostrager | 33/383 |
| 892,353 | 6/1908 | Blair | 33/379 |

Primary Examiner—Louis R. Prince
Assistant Examiner—Charles E. Phillips
Attorney—Burns, Doane, Swecker & Mathis

[57] ABSTRACT

A trailer level indicating device including a carrier body rotatably receiving a curved bubbled level tube in interference fit. When the device is mounted on a vehicle, access to the tube is blocked. Illumination of the level may be enhanced through the provision of reflectors, particularly those responsive to non-directional light.

2 Claims, 5 Drawing Figures

PATENTED OCT 23 1973

3,766,657

INVENTOR
EVAN L. HOPKINS

BY Burns, Doane, Swecker & Mathis
ATTORNEYS

TRAILER LEVEL INDICATING DEVICE

BACKGROUND OF THE INVENTION

This invention relates to a level indicating device. More particularly this invention relates to a level indicating device for attachment to a vehicle such as a trailer.

Level indicating devices which may be secured to vehicles have been proposed in the past. For example, such a device adhesively secured to an automobile is disclosed in the U.S. Pat. No. 3,422,544.

Although such indicators may be acceptable for some purposes, they may sometimes prove disadvantageous for a number of reasons. For example, when incorporating the bubble level indicator into the complete device, it is necessary to secure the bubble level in position by attaching a clear plastic material, shaped to cover the bubble level, to a backing member. Such an operation dictates either that the cover be positioned in a particular orientation with respect to the backing, or that the cover be cut to provide coextensively configured backing and cover.

It would, therefore, be desirable to provide a level indicating device for attachment to a vehicle in which a bubble level may be more easily assembled into the complete device.

Moreover, where bubble levels having the desirable characteristics of curvature along their longitudinal extent are employed, the assembly operation may be further complicated. This will be appreciated when it is considered that unless such a curved level is orientated so that the central convex portion faces upward when the level is horizontally positioned, the ability to locate the bubble between indicator lines adjacent that central convex portion is hindered. This may be attributed to the fact that the bubble "seeks" the uppermost position in the vial in which it is enclosed. Thus, if the convex central portion which is intended to indicate a level position is orientated downwardly, the bubble will tend to "seek" the upper end portions of the level so that the indicating device is less stable. It will, thus, be recognized that extreme care must be taken in the bubble level placement when assembling the cover on the backing of the prior proposed device previously described.

It would, therefore, be desirable to provide a level indicating device for attachment to a vehicle wherein a curved bubble level is employed with ease of assembly and without requiring special orientation of the central convex portion during the assembly operation.

According to the present invention, this is accomplished through structure facilitating a snap-in of the bubble level to its assembled position while permitting subsequent rotation of the level for proper orientation of the central convex portion.

It will be recognized that in addition to obviating or minimizing disadvantages of the sort previously noted, it would be desirable to provide a level indicating device for attachment to vehicles wherein a bubble level employed is not susceptible to removal independently of the remainder of the device. This, of course, minimizes the likelihood of inquisitive tampering which may otherwise be engaged in, particularly by children. It is further desirable that upon removal of the entire device, that the bubble level be replaceable, if necessary, without destroying the remainder of the device.

When such a level indicating device is mounted on a trailer or the like, provision for inexpensive illumination of the bubble level is also desirable, particularly where it is accomplished through reflectors responsive to non-directional light.

OBJECTS AND SUMMARY OF THE INVENTION

It is therefore the object of the present invention to obviate or minimize disadvantages of the type previously noted while providing a novel level indicating device for attachment to a vehicle that has desirable characteristics such as those noted above.

To this end, the invention employs a curved bubble level tube mounted in a receiving recess of a carrier body in a snap-interference fit. The level is positioned forward of a substantially planar rearmost surface of the carrier body so that when the carrier body is positioned with that surface overlying a substantially planar surface of a vehicle to which the device is secured, access to the tube independent of removal of the carrier body from the vehicle is blocked. The receiving recess includes end walls spaced apart by a distance substantially equal to the longitudinal extent of the tube, and two receiving pockets, one each adjacent one of the end walls.

The receiving pockets are dimensioned to frictionally and rotatably receive the tube and are spaced sufficiently from one another to expose the central portion of the tube on the front side of the carrier body for viewing. In this manner, the tube may be manually rotated to a stable level indicating position, i.e., with the central curved portion uppermost.

Illumination of the bubble level may be accomplished by the provision of a flat, thin strip of material, having a reflective surface, on the rear of the carrier body. A conventional reflector employed on truck bodies may also be utilized. Each of these reflectors is preferably of the type responsive to non-directional light. Thus, light directed merely in the vicinity of the bubble level may provide sufficient illumination.

The carrier body may advantageously be formed of a one piece molded construction with the end walls and the receiving pockets contiguous and extending forwardly of the surrounding front surface of the main portion of the carrier body.

A substantially straight reference surface extending longi-tudinally in the direction of the receiving recess on opposite sides of the central portion of that recess may be incorporated on the carrier body to facilitate orientation of the device in relation to the vehicle to which the device is secured.

Other objects and advantages of the present invention will become apparent from the following detailed description of preferred embodiments thereof with reference to the accompanying drawings in which like numerals indicate like parts and in which:

THE DRAWINGS

DETAILED DESCRIPTION

Figure 1:
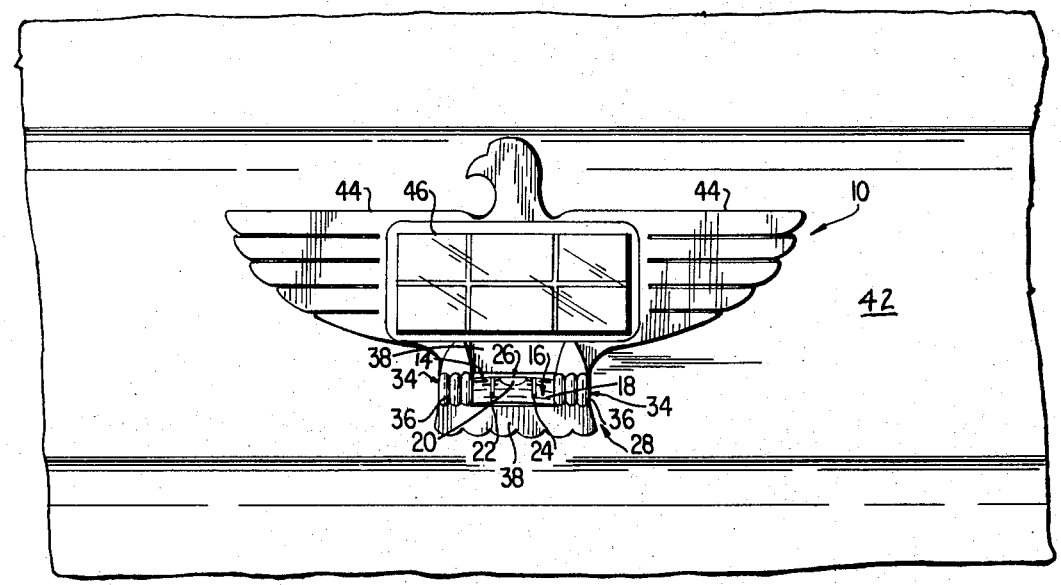
FIG. 1 is a front view of a level indicating device of the present invention incorporated on a trailer body.

With reference to FIG. 1 of the drawings, one form of a vehicle level indicating device 10 mounted on a trailer, partially shown at 12, according to the present invention may be seen. The device 10 includes a bubble level indicator 14 comprised of a closed, elongate, and generally cylindrical tube 16. The tube 16 contains a liquid 18, which may be colored, and a gas bubble 20 for centering between indicator lines to indicate a level position in a manner well known in the art. The indicator lines may be incorporated on the tube 16 at the central portion thereof as indicated at 22 and 24.

The tube 16 is transparent and curved along its lengthwise extent. For convenience, the indicator lines 22 and 24 may be located at the central convex portion 26 in order to facilitate orienting the bubble level of that convex portion 26 in the uppermost position when in use.

It will be apparent that the bubble level itself forms no part of the present invention which includes the bubble level indicator 14 in combination with a carrier body 28. As best viewed in FIG. 2, the carrier body 28 is provided with a substantially planar rearmost surface 30 for a purpose hereinafter more fully described.

The carrier body 28 also includes means defining an elongate receiving recess 32 including a slot 33 in the carrier body. The tube 16 is rotatably received in this recess 32 in a snap-in, interference fit forward of the rear surface.

Included in the receiving recess 32 are end walls 34 spaced apart by distance substantially equal to the longitudinal extent of the tube. These end walls receive the tube therebetween in interference fit.

Two receiving pockets 36, one each adjacent each of the end walls 34 are provided on the carrier body as part of the receiving recess 32. These pockets 36 are dimensioned to fricitionally and rotatably receive the tube 16 in its position forward of the rearmost surface 30 of the carrier body 28. In addition, the pockets 36 are spaced from one another sufficiently to expose the central portion of the tube on the front side of the carrier body, as may be seen in FIG. 1. With this arrangement, the tube may be easily manually rotated to a stable level indicating position, i.e. a position wherein the central convex portion 26 of the tube 16 points upward when the device is in use.

Preferrably, the carrier body 28 is a one piece molded construction. MOreover, the receiving pockets 36 are preferrably contiguous with the end walls, and together with the end walls project forwardly of the surrounding front surface 38 of the main portion of the carrier body. In this fashion, rotation of the tube 16 for proper positioning thereof is facilitated.

In the preferred embodiment, the tube 16 is circular in cross-section and the internal portion of the receiving pockets 36 may be generally curved to facilitate rotation of the tube to its proper position. It will, however, be appreciated that generally rectangular and other configurations will be acceptable so long as the tube may be rotated.

The formation of the carrier body from a plastic material and the projecting nature of the end walls of the receiving recess facilitates the interference fit of the tube 16. In this connection, and with reference to FIG. 3, it may be noted that slight projections 40 which may be provided during molding adjacent the portions of the receiving pockets 36 nearest the slot 33 also aid in the retention of the tube in position in a snap-in fit.

To assemble the tube 16 into the receiving recess 32 of the carrier body, one need only place the level over the slot 33 at the rear portion of the body. The level is then forced or snapped into position in the receiving recess 32 where it is supported, as previously mentioned, forward of the rearmost surface 30 of the carrier body 28. Thus, when the carrier body is positioned on a vehicle through suitable securing means, the substantially planar surface 42 (FIG. 1) of the vehicle, which the rearmost surface 30 of the carrier body overlies, blocks access to the tube 16. Thus, removal of the tube without removal of the carrier body from the vehicle is prevented.

After placement of the tube 16 in the receiving recess 32, the tube may be readily rotated through the application of pressure to the exposed tube portion on the front side of the carrier body 28. The thumb of the assembler may accomplish this rotation to thereby position the curved central portion of the tube in the uppermost orientation as illustrated in the drawings. It will be appreciated that the projection of the central portion of the receiving pockets 36 (and thus the tube) beyond the surrounding surface 38 of the carrier body 28 facilitates this turning. It should be noted, however, that the tube is frictionally received so that it remains in position in the absence of the application of such a force and that the frictional holding of the tube may be great enough to require several passes of the thumb over the exposed portion in order to rotate the tube.

Figure 2:
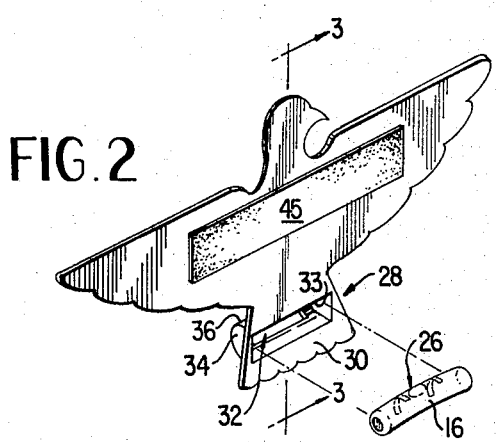
FIG. 2 is a rear perspective view of the device of FIG. 1.
Figure 3:
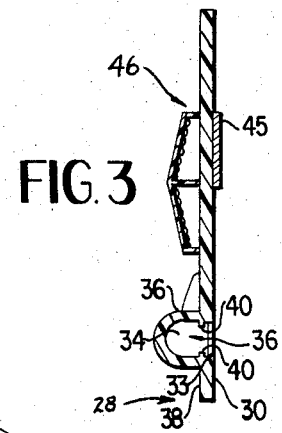
FIG. 3 is a cross-sectional view of the device of FIGS. 1 and 2 taken along line 3—3 of FIG. 2 and with the bubble level tube removed.

In order to facilitate the orientation of the entire device in relation to the vehicle to which the device is secured, the carrier body may be provided with means defining at least one substantially straight reference surface 44 extending longitudinally oppositely in the direction of the receiving recess 32 on opposite sides of the central portion thereof. In the device of FIGS. 1 through 3, these reference surfaces 44 are provided, for example, by the upper portion of the wings of the decorative eagle forming a continuation of the carrier body 28.

Figure 4:
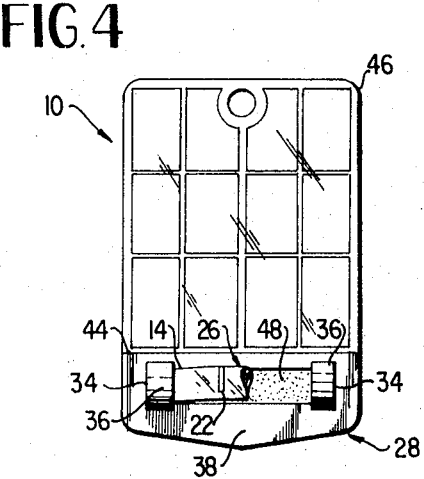
FIG. 4 is a front view of another form of a level indicating device according to the present invention.

In the device of FIG. 4, the reference surfaces 44 are contiguous and are provided by the upper portion of the carrier body.

As shown in FIG. 2, the level indicating device 10 may be attached to the vehicle through the incorporation of a double faced adhesive member 45 mounted on the back of the carrier body. A cover (not shown) may be removably secured to the outer portion of the adhesive member 45 in a manner well known. A similar adhesive fastening means may be applied in connection with the device of FIGS. 4 and 5 (that device being similar in other respects to that of FIGS. 1 - 3 with similarities indicated with like numerals) or other fastening means may also be incorporated as desired.

For example, as shown in FIG. 4, the carrier body 28 is attached to a conventional reflector 46 which may be suitably secured to the trailer body. It is particularly significant that this reflector 46 is of the type that is responsive to non-directional light, i.e., the reflector serves to aid in the illumination of the tube 16 when light is directed merely to the general vicinity of the device 10 as opposed to in a specific direction. A similar reflector 46 may be mounted on the body portion of the decorative eagle of FIG. 1 adjacent the carrier body 28.

Figure 5:
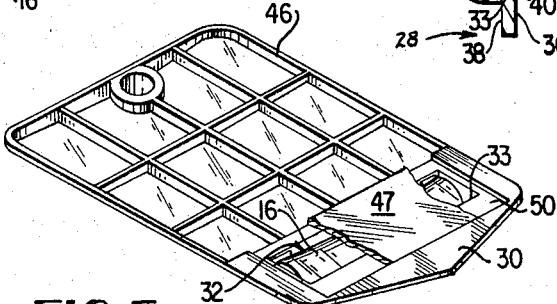
FIG. 5 is a rear perspective view of the device shown in FIG. 4 with a portion of the reflective strip broken away.

As seen in FIG. 5, illumination may be enhanced through the provision of a generally flat, thin strip of material 47 positioned at the rear of the carrier body 28. The strip 47 has a reflective surface 48 (FIG. 4) disposed directly behind the tube 16 over the slot 33 of the receiving recess 32. This reflective surface is also responsive to non-directional light to illuminate the tube 16. If desired, the strip 47 may be positioned within a depressed surface 50 inset from the rearmost planar surface 30 of the carrier body.

Holding of the strip in position may be accomplished through the utilization of a separate piece of masking tape or the like, or, for example, by using a strip with adhesive edges for securing the strip to the depressed surface 50. At any rate, it will be apparent that the strip may be easily assembled and does not hinder the positioning of the rearmost surface 30 of the carrier body in overlying relationship to the planar surface of the vehicle when the device 10 of FIGS. 4 and 5 is mounted in a manner similar to that of FIGS. 1 through 3.

From the foregoing it will be seen that a novel level indicating device for attachment to a vehicle has been provided in a manner that gives rise to simple assembly.

Of particular significance is the snap-in interference fit and the fact that the curved bubble level tube need not be specially oriented during the assembly operation since the snap-in interference fit also permits rotation for proper orientation if needed.

Also of importance is the feature of the invention whereby the level tube is not susceptible of removal independently of the device attached to the vehicle so that the likelihood of inquisitive tampering is minimized.

Of independent significance is the provision for illumination of the tube with reflectors responsive to non-directional light where light is merely directed in the vicinity of the device. Thus, one need only position a flashlight or the like so as to shine light in the general direction of the device.

Although the invention has been described in connection with preferred embodiments thereof, it will be appreciated that additions, substitutions, modifications and deletions may be made by those skilled in the art without departing from the spirit or scope of the invention as defined in the appended claims.

What is claimed is:

1. A vehicle level indicating device comprised of:
  a closed, elongate, generally cylindrical tube containing a liquid and a gas bubble for centering between indicator lines to indicate a level position of a vehicle to which the device is secured, said tube being transparent and having an arcuate curvature along its lengthwise extent; and
  a tube carrier body being of one-piece construction and having:
    a substantially planar rearmost surface for overlying a substantially planar surface of a vehicle to which the device is secured; and means defining a receiving recess for rotatably receiving said tube in snap-in interference fit forward of said rear surface and with the central portion of said tube exposed at the front of said carrier body to render said tube accessible to manual rotation into an uppermost orientation after said tube has been received in said receiving recess, said receiving recess including:
      receiving pockets, and
      end walls spaced apart by a distance substantially equal to the lengthwise extent of said tube for receiving said tube therebetween in interference fit,
      said end walls and said receiving pockets being contiguous and extending forwardly of the surrounding front surface of the main portion of said carrier body,
      said associated end walls and receiving pockets being spaced apart from one another to expose said central portion of tube:
    means covering the back of said receiving recess comprising a generally flat, thin strip of material having a reflective surface positioned on said carrier body behind said tube, said strip being positioned independently of orientation of said tube so that said tube may be rotated free of interference from said strip; means defining substantially straight reference surfaces extending longitudinally in the direction of said receiving recess on opposite sides of the central portion thereof to facilitate orientation of the device in relation to the vehicle to which the device is secured; and
    means for securing said carrier body to a vehicle with said rearmost surface overlying the substantially planar surface of the vehicle to thereby block access to said tube to prevent removal thereof without removal of said carrier body from the vehicle.

2. The indicating device according to claim 1 and including further reflective means mounted on said front surface above said tube and being responseive to non-directional light for illuminating said tube with reflected light from a source directed merely in the vicinity of said reflective means.

* * * * *